UNITED STATES PATENT OFFICE.

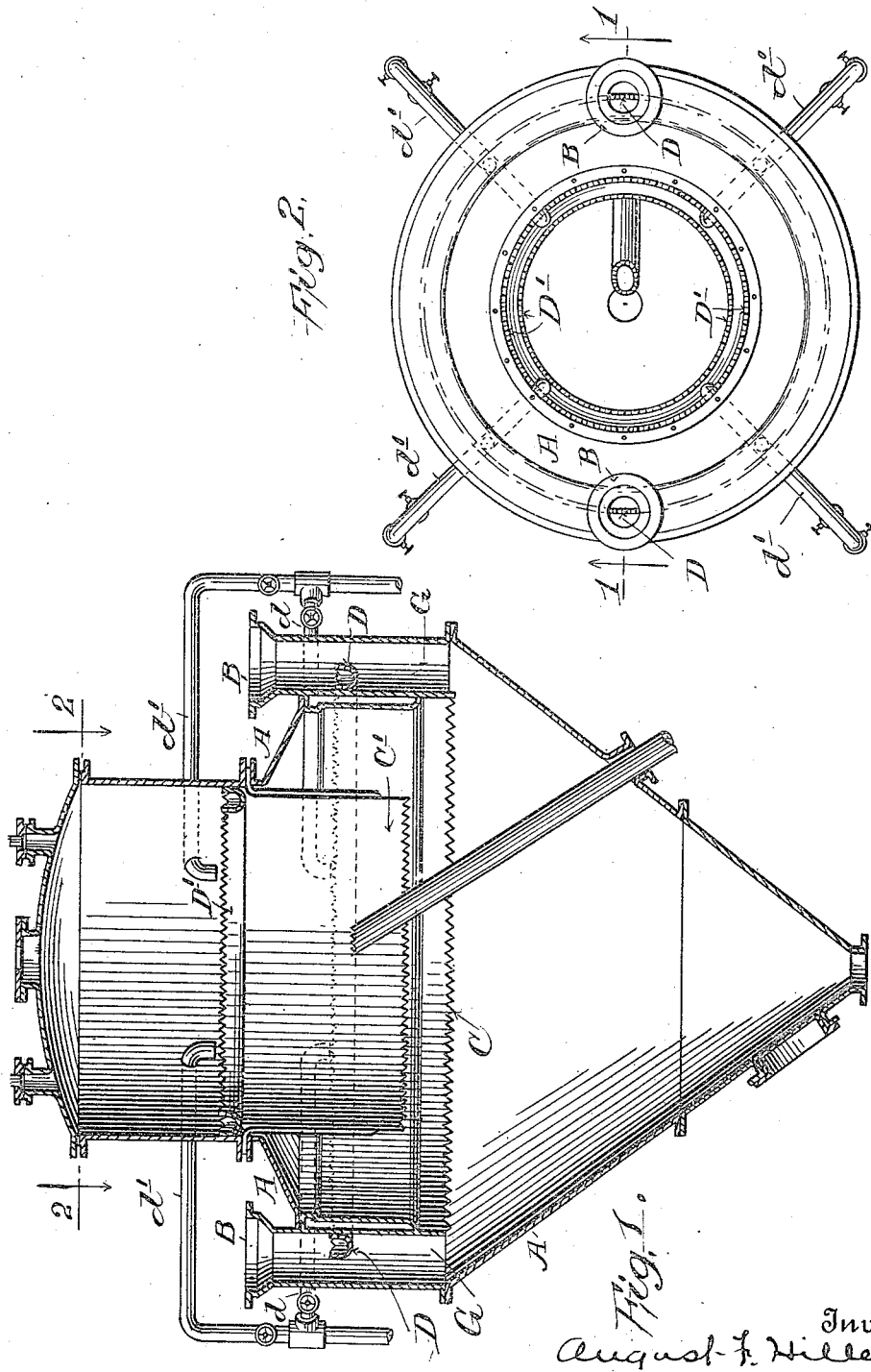

AUGUST F. HILLEKE, OF ENSLEY, ALABAMA, ASSIGNOR TO SEMET-SOLVAY COMPANY, OF SOLVAY, NEW YORK, A CORPORATION OF PENNSYLVANIA.

AMMONIA-SATURATOR.

1,163,753.

Specification of Letters Patent. Patented Dec. 14, 1915.

Application filed April 10, 1915. Serial No. 20,448.

*To all whom it may concern:*

Be it known that I, AUGUST F. HILLEKE, a citizen of the United States, residing at Ensley, in the county of Jefferson and State of Alabama, have invented certain new and useful Improvements in Ammonia-Saturators, of which the following is a specification.

My invention relates to the construction of the vessel or saturator employed in the manufacture of sulfate of ammonia in which the sulfate salt is formed by the contact of the ammonia carrying gas with sulfuric acid. In the operation of such a device the gas is brought into intimate contact with the acid by being caused to pass under baffle plates which project downward into the acid and a difficulty has been experienced owing to the fact that the salt is quickly formed at the points where the gas passes under the baffles and is built up in masses which adhere to the baffle plates and obstruct the gas way.

The object of my improvements is to remedy this difficulty and provide for the free passage of the gas into the saturator at all times.

The invention will be best understood by reference to the accompanying drawings illustrating an embodiment thereof, Figure 1 showing a vertical section on the line 1—1, Fig. 2, and Fig. 2 showing a plan view sectioned on the line 2—2, Fig. 1.

Referring to the drawings, A, indicates the shell of the saturator, B, B, are gas inlets through which the ammonia carrying gas enters the saturator, entering first a gas way, G, the outer wall of which is the outer wall of the saturator and its inner wall a cylindrical baffle, C, the lower edge of which lies below the level of the acid in the saturator. After entering the saturator the gas is brought into contact with the acid by being caused to pass under the serrated edge of the cylindrical baffle, C, and afterward, preferably, under a second similar baffle, C'.

To the outer, upper surface of the baffle, C, is secured an acid feed trough, D, which extends around the baffle. A similar acid feed trough, D', is secured to the baffle, C'. The feed troughs, D, D', are, preferably, provided with serrated edges, so that the acid will be fed downward in fine streams, and are supplied with acid through the feed pipes, d, d'.

In the operation of the device the salt formed by the passage of the gas through the acid tends to build up in masses on the lower edges of the baffles, C, C'. The fresh acid required for the maintenance of the operation is fed, as called for, into the troughs, D, D', and thence flows downward over the surfaces of the baffles. Thus it comes into contact with any salt that may have formed upon the baffle and cuts the same away causing it to fall down to the bottom of the saturator, out of the gas way. In this manner a free supply of gas to the saturator is maintained at all times.

What I claim as new and desire to secure by Letters Patent is:

1. In a saturator the combination with a cylindrical baffle of a circular acid supply trough secured to the upper part of the baffle, and adapted to deliver acid upon the surface thereof.

2. In a saturator, the combination of a gas way, a baffle and an acid feed trough located in the gas way and adapted to deliver acid contiguous to the surface of the baffle.

In testimony whereof, I have hereunto subscribed my name, this 5th day of April A. D., 1915.

AUGUST F. HILLEKE.

Witnesses:
EUGENE S. MILLER,
HARRY M. COWART.

Copies of this patent may be obtained for five cents each, by addressing the "Commissioner of Patents, Washington, D. C."